G. M. EATON.
LOCOMOTIVE DRIVING MECHANISM.
APPLICATION FILED NOV. 29, 1915.
1,306,531.
Patented June 10, 1919.
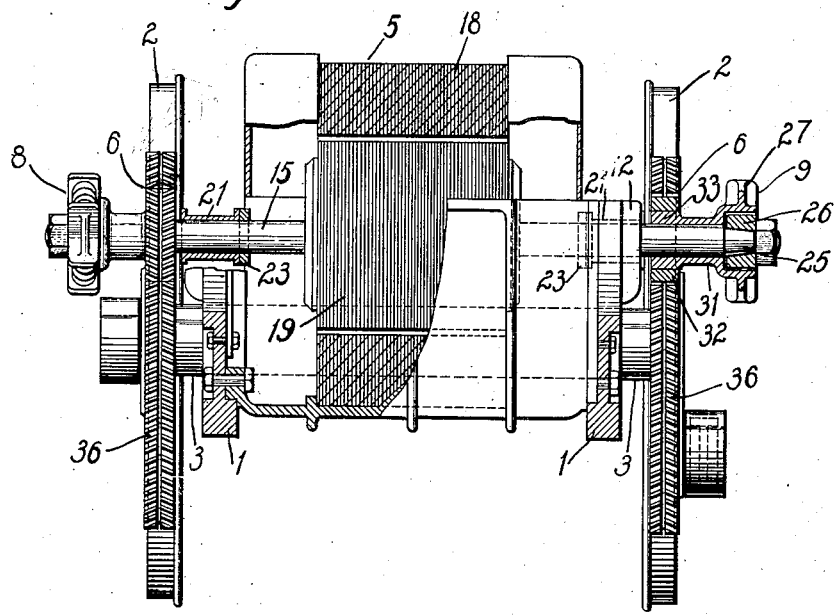
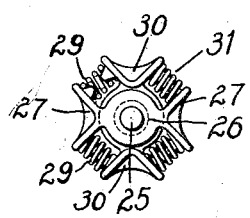
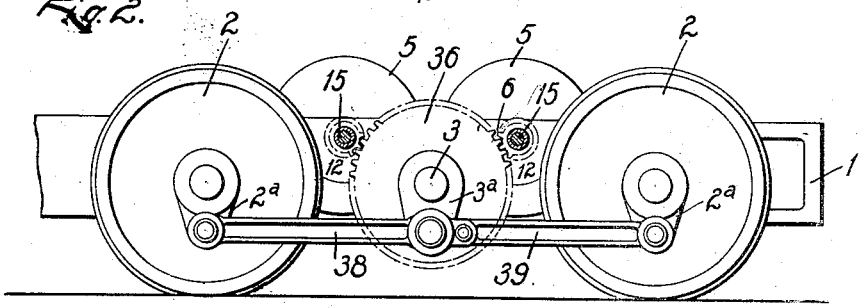
WITNESSES
R. J. Fitzgerald
W. C. McCoy
INVENTOR
George M. Eaton.
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE DRIVING MECHANISM.

1,306,531.    Specification of Letters Patent.    Patented June 10, 1919.

Application filed November 29, 1915. Serial No. 64,035.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Driving Mechanisms, of which the following is a specification.

My invention relates to locomotive driving mechanisms, and it has special reference to electric locomotives having driving wheels which are propelled through the agency of side rods and jack shafts that are coupled to a plurality of electric driving motors by means of so-called "double-end gearing."

One object of my invention is to provide a locomotive of the above-mentioned character which shall be simple, rugged and durable in construction and effective and reliable in operation, and which shall be provided with adequate provision for independent flexibility between the several motor armatures and associated jack shafts, whereby the proper meshing of the gear teeth is insured.

More specifically, an object of my invention is to provide a locomotive driving mechanism which embodies herringbone or similar longitudinally-centering gear wheels which are self-alining, in a longitudinal direction, and, moreover, to provide means for restraining the armature shafts and jack-shafts against longitudinal thrusts and for introducing an element of resiliency or flexibility into the gearing in such manner as to relieve the teeth of the pinions and gear wheels from the strains resulting from the usual end thrusts, whereby the longitudinal and angular operative positions of the pinions are determined entirely by the teeth of the gear wheels.

In another aspect, it is an object of my invention to provide a driving mechanism, of the type referred to, in which the pinions have a yielding connection with the respective armature shafts by means of flexible couplings which are located outside of the gearing, whereby they are readily accessible for inspection, maintainance, and repairs.

When the herringbone, Citroen, or other longitudinally-centering gearing is employed in transmission mechanisms, the teeth of the gearing have a tendency to insure proper alinement. However, if the propulsion be effected through electric driving motors, the inherent end thrusts of the armatures are taken up by the gear teeth which are thus subjected to undesirable and injurious wear that prevents the proper meshing of the teeth.

Also when the usual flexible couplings are provided to permit of an equalization of the load between the respective ends of the driving shafts and the associated jack-shafts, no centering action is possible, by reason of the fact that the driving springs are located and confined within the gearing in such manner as to preclude all relative longitudinal adjustments. Furthermore, in such gears, the springs are entirely inclosed in a very limited space which makes ample lubrication essential, renders maintenance and inspection difficult and necessitates an extremely compact structure which results in working the springs upon a very short radius.

According to my present invention, I employ a plurality of independent flexible couplings upon the respective ends of the driving shafts, each of which comprises a sleeve or quill which loosely surrounds the shaft and the inner end of which is rigidly fixed to the pinion, while the outer end is resiliently connected to the shaft by means of a yielding driving connection embodying suitable springs. I contemplate also restraining the armature shafts and jack-shafts against longitudinal displacement by means of thrust-collars, or other well-known means, so that no end thrusts are imposed upon the gear teeth, while the coöperating pinions and gear wheels are permitted to adjust themselves longitudinally to effect the desired operative alinement for meshing of the gear teeth, through the agency of the flexible driving connections between the armature shafts and the pinions. In this manner, both longitudinal and angular adjustments of the pinions are permitted, whereby the load is equally distributed between the gearing at the respective ends of the driving shaft, while best operating conditions are obtained by reason of the full meshing of the gear teeth.

In the accompanying drawing, Figure 1 is a view, partially in section and partially in end elevation of a portion of a locomotive driving mechanism constructed in accordance with my invention; Fig. 2 is a view in side elevation of the mechanism shown in Fig. 1; and Fig. 3 is an enlarged detail view, in elevation, of one of the flexible couplings.

Referring to the drawing, the apparatus shown comprises a plurality of side frames 1, a plurality of driving wheels 2, a jack-shaft 3, a plurality of electric motors 5, sets of gearing 6, and a plurality of flexible couplings 8, only a part of which are shown.

The side frames 1, are of any suitable construction and are adapted to be carried upon the driving wheels 2, in the usual manner, while a plurality of suitable bearing housings 12 are associated therewith for the purpose of supporting a plurality of driving shafts 15 upon which the motors 5 are respectively mounted.

The bearing housings pertain only indirectly to my invention and may therefore embody any construction that is known in the art.

The motors 5 are of like construction and each embodies a stationary field-magnet structure 18 and a rotatable armature 19 that is mounted upon its associated shaft 15 in the usual manner. As shown, the field-magnet structure 18 is of a peculiar type which is set forth in detail in my co-pending application Serial No. 837,745, filed May 11, 1914, and assigned to the Westinghouse Electric & Manufacturing Company. My invention, however, is not restricted in any sense to this form of field-magnet structure, it being evident that it forms no part of my invention except as it constitutes a necessary element of the driving motor.

Surrounding the opposite ends of each of the armature driving shafts 15, are the usual bearing brasses 21 which are positioned within the bearing housings 12 and have an end-to-end engagement with a plurality of suitable thrust collars 23, that are rigidly fixed to the respective armature shafts 15. Thus, the natural tendency of the armatures to move longitudinally is restrained, and the end thrusts incident to this movement are resisted.

Each end of each of the driving shafts 15 is provided with a tapered portion 25 upon which a member 26 is rigidly mounted. The member 26 may conveniently be provided with a plurality of oppositely projecting arms 27 which are adapted to coöperate with and position a plurality of driving springs 29 that are located between said arms and arms 30 of a relatively movable sleeve member or quill 31. Thus, a flexible coupling of a well-known type is provided, although it should be understood that the particular coupling is only representative of any device of a similar character for performing a like function. The quill 31 is loosely mounted upon the end of the driving shaft 15 and has a pinion 32 rigidly secured to its inner end 33. It is evident, therefore, that the pinion 32, may be moved slightly both angularly and longitudinally, with respect to the driving shaft through the agency of the flexible coupling thus formed.

The jack-shaft 3 is supported and carried by the side frames 1 and is located intermediate and below the several driving shafts 15, and, moreover, is provided with a plurality of gear wheels 36 that are located upon the respective ends thereof and are adapted to coöperatively engage the pinions 33 that are carried upon the opposite ends of the several driving shafts 15.

In order to mechanically couple the jack-shaft 3 to the driving wheels 2, suitable crank arms 2$^a$ and 3$^a$ and side connecting rods 38 and 39 are employed, although other means for effecting this connection may be used.

The several pinions 33 and gear wheels 36 are preferably of the herringbone type, although so-called Citroen gear wheels, or others of the centering type, may be equally applicable. It is evident that, with gears of this general class, there is tendency for them to become self-alining or centering, whereby the full and proper meshing of the gear teeth is insured.

With the peculiar arrangement and location of the parts hereinbefore set forth, the flexible couplings 9 permit of relative angular adjustments of the pinions with respect to the driving shafts, whereby an equal distribution of the load between the respective transmission gearings is effected, while said couplings also permit of longitudinal adjustments of the pinions in such manner as to effect the proper meshing of the gear wheel and pinion teeth. Furthermore, the flexible couplings are located outside of the transmission gearing, where they are readily accessible for maintenance and inspection. Said couplings 9 may conveniently be of the open and exposed type and may, moreover, be of such dimensions as to permit of the use of springs that may be worked upon a relatively large radius, whereby the couplings may act with an arm greater than the radius of the pinion-tooth pitch circle, and thus have a mechanical advantage greater than the pinion teeth.

In some cases, it may be desirable to employ gear wheels of the helical-tooth type, for instance, which operate with an axial thrust, in contradistinction to the self-alining or centering characteristic of gear wheels of the herringbone class. Under such conditions, suitable thrust collars for resisting the resulting end thrusts of the quills 31, should be employed, as will be understood.

Although I have shown and described a locomotive driving mechanism embodying more or less specific structural details and arrangement and location of parts, my invention, in its broadest aspect, is not limited in these respects, and many modifications therein may be effected without departing from the spirit and scope of my invention. I desire, therefore that only such limitations shall be imposed as are indicated in the appended claims.

I claim as my invention:

1. The combination with a shaft, and a motor armature mounted thereon, of a plurality of driving pinions associated with said shaft, and a plurality of resilient means associated with said shaft, one of said resilient means disposed longitudinally outside of each of said pinions for mechanically connecting said pinion to said shaft.

2. The combination with a shaft, and a motor armature mounted thereon, of a plurality of driving pinions associated with said shaft, and a resilient coupling disposed longitudinally outside each of said pinions for effecting a yielding driving connection between said shaft and each of said pinions.

3. In a locomotive driving mechanism, the combination with a driving shaft, of sleeves mounted on the opposite ends of said driving shaft, pinions on said sleeves, a jack shaft, gear wheels on the opposite ends of said jack shaft meshing with said pinions, and means whereby said sleeves are independently and yieldingly connected to said driving shaft to automatically equalize the driving effort delivered at the ends of the driving shaft.

4. In a locomotive driving mechanism, the combination with a plurality of rotatable shafts, means for restraining each of the said shafts against longitudinal movement, and a plurality of power-transmitting members loosely associated with each of said shafts, of a flexible driving means interposed between each of said members and the associated shaft for permitting longitudinal adjustments of said members with respect to said shafts, a driven shaft, and a plurality of gear wheels mounted on said driven shaft and associated with said power-transmitting members.

5. In a locomotive driving mechanism, the combination with a driving shaft, of pinions mounted on opposite ends of said shaft, a jack shaft, gear wheels on the ends of said jack shaft meshing with the pinions at corresponding ends of said driving shaft, and means disposed longitudinally beyond, and outside, said pinions for resiliently and independently connecting the pinions to the ends of the driving shaft.

6. The combination with a driving shaft restrained against longitudinal movement, a jack-shaft similarly restrained, gear wheels associated with the respective ends of said jack-shaft, and pinions loosely mounted upon the respective ends of the driving shaft and adapted to coöperatively engage said gear wheels, of resilient means severally interposed between said driving shaft and said pinions for permitting said pinions to be adjusted longitudinally and angularly with respect to said driving shaft and as determined by the teeth of said gear wheels.

7. The combination with a driving shaft restrained against longitudinal movement, a jack-shaft similarly restrained, gear wheels associated with the respective ends of said jack-shaft, and pinions loosely mounted upon the respective ends of the driving shaft and adapted to coöperatively engage said gear wheels, of resilient couplings respectively disposed longitudinally outside of said pinions and between said driving shafts and said pinions for permitting longitudinal and angular adjustments thereof with respect to said gear wheels.

8. The combination with a driving shaft restrained against longitudinal movement, a jack-shaft similarly restrained, gear wheels associated with the respective ends of said jack-shafts, and pinions loosely mounted upon the respective ends of the driving shaft and adapted to coöperatively engage said gear wheels, said pinions and gear wheels being provided with herringbone or similar centering teeth, of independent resilient driving connections between said driving shaft and said pinions and adapted to permit the pinions to be longitudinally centered to coöperatively engage the teeth of said gear wheels.

9. The combination with a longitudinally fixed rotatable shaft, a pinion loosely mounted thereon and a longitudinally fixed gear wheel adapted to coöperatively engage said pinion, said pinion and said gear wheel having longitudinally-centering teeth, of a resilient driving connection between said pinion and said rotatable shaft for permitting the longitudinal adjustment of said pinion to effect full coöperative engagement of the teeth of said pinion and said gear wheel.

10. The combination with a gear wheel, a plurality of pinions coöperating with said gear wheel, and a corresponding number of shafts, said pinions severally mounted on said shafts, of resilient driving means between said pinions and said respective shafts for permitting relative angular adjustments of said pinions with respect to said shafts.

11. The combination with a plurality of driving shafts, motor armatures mounted thereon, and a plurality of flexible pinions associated with the respective ends of each of said shafts, of a driven shaft, and a plurality of gear wheels fixed thereto in operative working relation with said flexible pinions.

12. The combination with a plurality of shafts, a plurality of herringbone or other longitudinally-centering gear-wheels fixed to one of said shafts and a corresponding number of similar pinions loosely associated with the other shaft and adapted to coöperate with the gear wheels, of means for permitting said pinions to adjust themselves to properly mesh with the teeth of said gear wheels.

13. The combination with an armature shaft, toothed pinions associated therewith, a jack-shaft and coöperating toothed gear wheels fixed thereto and adapted to mesh with the respective pinions, of means associated with said armature shaft and said pinions for preventing the thrust of the armature from being imposed upon the teeth of said pinions and gear wheels and for permitting longitudinal adjustments of said pinions.

14. In a locomotive driving mechanism, the combination with a motor shaft, of pinions mounted on opposite ends of said shaft, a jack shaft, gear wheels on the ends of said jack shaft meshing with the pinions at corresponding ends of said motor shafts; and means, comprising a plurality of spiral springs having their axes non-radially disposed in a plane perpendicular to said motor shaft, for connecting each pinion to said motor shaft.

In testimony whereof, I have hereunto subscribed my name this 24th day of Nov. 1915.

GEORGE M. EATON.